(12) United States Patent
KoKovidis et al.

(10) Patent No.: US 12,551,106 B2
(45) Date of Patent: Feb. 17, 2026

(54) AUTOMATED DEVICE PAIRING USING BIOMETRIC IDENTIFIER

(71) Applicant: Drägerwerk AG & Co. KGaA, Lübeck (DE)

(72) Inventors: Georgios KoKovidis, Waltham, MA (US); Juan P. Eslava, Groton, MA (US); Randolph Prydekker, Wilmot, NH (US)

(73) Assignee: Drägerwerk AG & Co. KGaA, Lübeck (DE)

( * ) Notice: Subject to any disclaimer, the term of this patent is extended or adjusted under 35 U.S.C. 154(b) by 510 days.

(21) Appl. No.: 17/917,183

(22) PCT Filed: Apr. 6, 2021

(86) PCT No.: PCT/EP2021/058949
§ 371 (c)(1),
(2) Date: Oct. 5, 2022

(87) PCT Pub. No.: WO2021/204805
PCT Pub. Date: Oct. 14, 2021

(65) Prior Publication Data
US 2023/0157545 A1    May 25, 2023

Related U.S. Application Data

(60) Provisional application No. 63/005,839, filed on Apr. 6, 2020.

(51) Int. Cl.
*A61B 5/117* (2016.01)
*A61B 5/00* (2006.01)
*A61B 5/024* (2006.01)
*G16H 10/60* (2018.01)
*G16H 40/67* (2018.01)

(52) U.S. Cl.
CPC ........ *A61B 5/0024* (2013.01); *A61B 5/02405* (2013.01); *A61B 5/117* (2013.01); *A61B 5/742* (2013.01); *G16H 10/60* (2018.01); *G16H 40/67* (2018.01)

(58) Field of Classification Search
CPC .......... A61B 5/0002–0031; A61B 5/117–1178
See application file for complete search history.

(56) References Cited

U.S. PATENT DOCUMENTS

| | | | |
|---|---|---|---|
| 2003/0135097 A1* | 7/2003 | Wiederhold | A61B 5/02405 600/509 |
| 2009/0206992 A1 | 8/2009 | Giobbi et al. | |
| 2011/0221590 A1 | 9/2011 | Baker et al. | |

(Continued)

FOREIGN PATENT DOCUMENTS

| | | |
|---|---|---|
| WO | 2013103342 A1 | 7/2013 |
| WO | 2016064906 A1 | 4/2016 |

OTHER PUBLICATIONS

European Patent Office, The International Search Report and The Written Opinion of the International Searching Authority, Jun. 23, 2021, for International Application No. PCT/EP2021/058949.

*Primary Examiner* — Eugene T Wu
(74) *Attorney, Agent, or Firm* — Nolte Lackenbach Siegel

(57) ABSTRACT

Disclosed are systems, methods, and devices that provide automated and secure pairing of a wireless device to a patient monitor device (PMD) and/or network or network of devices using a unique biometric identifier.

19 Claims, 7 Drawing Sheets

(56) References Cited

U.S. PATENT DOCUMENTS

2013/0005266 A1* 1/2013 Singh .................. H04L 63/0492
                                                    455/41.2
2016/0310005 A1* 10/2016 Pekander ............... A61B 5/117
2017/0147360 A1* 5/2017 Reunamaki ......... H04L 41/0809
2017/0325721 A1* 11/2017 Matsuda .............. A61B 5/0059

* cited by examiner

AUTOMATED DEVICE PAIRING USING BIOMETRIC IDENTIFIER

CROSS-REFERENCE TO RELATED APPLICATIONS

This application is a national stage application of International Patent Application No. PCT/EP2021/058949 filed on Apr. 6, 2021, under 35 U.S.C. § 371, which claims the benefit of U.S. Prov. Pat. App. Ser. No. 63/005,839, filed on Apr. 6, 2020. Priority to and the benefit of U.S. Prov. Pat. App. Ser. No. 63/005,839 is hereby claimed for all purposes, including the right of priority, International Patent Application No. PCT/EP2021/058949 and U.S. Prov. Pat. App. Ser. No. 63/005,839 are hereby incorporated herein by reference in their entirety and to the extent that is not inconsistent with the present disclosure.

FIELD OF THE DISCLOSURE

The present disclosure generally relates to a system, method, and/or device for pairing a wireless physiological sensor to a patient monitoring device (PMD) based on a comparison of biometric identifiers.

BACKGROUND OF THE DISCLOSURE

Monitors that include electronic visual displays are utilized in a large number of applications within a wide variety of industries including, for example, the healthcare industry, the military, and the oil and gas industry. Many of the applications within such industries require such monitors to, at times, be portable, and, at other times, be stationary. For example, in the healthcare industry, when not being used in transport of a patient or when a patient is ambulatory, monitors can be connected to a monitor mount. Such monitor mounts can provide a variety of functions including providing physical support, a power source, and a conduit to one or more computer networks.

One type of monitor is a patient monitor which is used by healthcare facilities to monitor and display information about a patient, such as vital signs (e.g., a heart rate, electrocardiogram waveform, a blood pressure, patient temperature, and respiration rate and/or volume), status of connected devices (physiological sensors, etc.), and the like. Patient monitors can be portable devices that travel with the patient in order to provide continuous monitoring during care. When a patient arrives at a hospital room or other treatment location, the patient monitor is often plugged into or otherwise connected to a patient monitor mount. Patient monitor mounts provide a physical interface for the patient monitor and are generally fixed to the treatment location. Patient monitor mounts can also provide electrical connection to other devices or infrastructure, such as power to recharge patient monitor batteries, network connectivity to other medical devices or hospital computer systems, and the like. Patient monitors have different sizes and provide different functionalities. With current systems, each type of patient monitor typically requires a dedicated monitor mount, a dedicated controller, and a dedicated user interface controller and the same user interface, and that can be universally docked to the monitor mount.

During the course of providing healthcare to patients, healthcare practitioners, referred to herein as practitioners, typically connect at least one type of sensor to a patient to sense, derive, or otherwise monitor at least one type of patient medical parameter. Such patient connected sensors are further connected to a monitor that includes all relevant electronic components that enable conversion, manipulation and processing of the data sensed by the at least one type of sensor in order to generate patient medical parameters. These patient medical parameters may be stored in one or more modules and are usable by healthcare practitioners (e.g., nurses, surgeon, doctors, physician assistants, technicians, emergency medical technicians, first responders, or any other person charged with providing a healthcare service to a patient) in monitoring a patient and determining a course of healthcare to be provided to the patient. Additionally or alternatively, the one or more modules may contain data, such as patient treatment data, to be transferred to the dock and/or the monitor.

A monitor may be selectively connected to a patient at any point during which a healthcare professional comes into contact with the patient and may remain connected with the patient as the patient moves through various locations within a particular healthcare enterprise (e.g., hospital) or between different healthcare enterprises (e.g., an ambulance and/or different medical facilities). With conventional systems, the monitor and/or the module can be selectively connected (docked) to a stationary or fixed dock that may serve as a gateway for connecting the monitor and/or the module to a database such as hospital information system (HIS), electronic medical records (EMR) system, and/or a central monitoring station and allowing data representing the at least one patient medical parameter to be communicated to other systems within the healthcare enterprise. This data may then be used by one or more different systems in further patient care.

During the course of patient treatment, the practitioner needs to manually and repeatedly pair or match one or more diagnostic or treatment devices with the monitor, the hospital information system, and/or central monitoring station to securely capture or assign data to the patient's record.

Wireless diagnostic and treatment devices are becoming more commonly used in hospital environments. Manual pairing of such devices by practitioners is time consuming, requires training on pairing procedures, and can lead to human error. Current systems do not provide any reliable means for automatic pairing of such devices to patient monitors. Accordingly, there is a need for an efficient and reliable process for pairing wireless devices to patient monitors.

SUMMARY OF THE DISCLOSURE

The exemplary embodiments described herein provides a system, method, and device including same that provides an automated and secure pairing of a wireless device to a patient monitor device (PMD) and/or network or network of devices using a unique biometric identifier. As a result, the need for manual interaction by the clinician to pair a first device (such as, without limitation, a patient monitoring device or therapy device) with one or more second devices (such as, without limitation, a monitoring device, a therapy device, physiological sensors including ECG sensors, peripheral capillary oxygen saturation (SpO2) sensors, temperature sensors, or non-invasive blood pressure (NIBP) sensors) in a network, preferably a hospital network, in order communicate with each other in a seamless way is eliminated. In one aspect, the system, method, and/or device described herein allows placement of multiple wireless or second device(s) (such as, without limitation, Bluetooth®, WiFi, sub GHz for example), to be paired with a first device without the need for a healthcare practitioner to manually initiate the pairing process.

In one aspect, there is provided a method comprising: acquiring a biometric identifier from a patient using a first device and uploading the biometric identifier to a database; obtaining physiological parameter data of the patient using a second device; transmitting the physiological parameter data of the patient to the database; and comparing the physiological parameter data of the second device with the biometric identifier to match the physiological parameter data with the biometric identifier in the database. In preferred embodiments, the second device comprises a substantially similar means for capturing the biometric identifier of the patient as the first device to see if a patient match can be established.

In a further aspect, there is provided a method comprising: acquiring a biometric identifier from a patient using a first device comprising an electrocardiogram to obtain a heart rate; recording the heart rate over a certain amount of time to provide a heart rate variability of the patient; uploading the heart rate variability of the patient to a database; obtaining physiological parameter data of the patient using a second device which at least measures the heart rate; transmitting the physiological parameter data of the patient to the database; and comparing the physiological parameter data of the second device with the heart rate variability to match the physiological parameter data with the biometric identifier in the database; and the physiological parameter data of the patient from the second device is substantially identical to the heart rate variability obtained from the first device then the physiological parameter of the patient is paired in the database.

In light of the above, the present disclosure is broadly directed to a system comprising a first device and a second device which are paired using at least one biometric identifier. The biometric identifier is unique to the patient and allows for the automatic and secure pairing of any data that is obtained, received, or transmitted about the patient to at least one of a second device, a database such as, without limitation, a hospital information system, or combinations thereof. In certain embodiments, the system or method described herein allows a first device to be paired with a second device independent of a network. In other embodiments, the system or method described herein allows a first device to be paired with a network and/or a second device that resides on a network.

In one embodiment, the first device, the second device, or both can include a sensor interface configured to receive data generated by at least one physiological sensor monitoring a physiological parameter of a patient. The at least one physiological sensor can include a wired connection to the sensor interface. The at least one physiological sensor can additionally or alternatively include a wireless connection to the sensor interface.

In one embodiment, the first device, the second device, or both can be a multiparameter monitor for continuously monitoring adult, pediatric and neonatal patients both at a bedside and on transport and can support all patient acuity levels hospital-wide.

In one embodiment, either of the first device or the second device can comprise a monitor that capture and display real-time vital signs at the bedside. Either of the first monitor or the second monitor can be used as a standalone monitor or in combination. The system of the present disclosure integrates patient data and provides continuous monitoring at the bedside and on transport.

In one embodiment, the system of the present disclosure enables pick and go transport of a patient from one care area of a hospital to another care area of the hospital without having to disconnect the patient from a patient monitor. For example, the system of the present disclosure streamlines workflows by being able to go from bedside to transport at the push of a button. Cables and modules can remain attached to the patient and parameters and alarms can continue to be monitored in real time, while recording data during travel. The system of the present disclosure can also provide seamless wired-to-wireless networking, so surveillance can be continuous. No disconnection or reconnection of leads is required and there are no gaps in monitoring or data acquisition. As a result, all parameters that are monitored at the bedside can continue to be monitored on transport.

The system of the present disclosure therefore allows monitors to be mixed and matched across different care areas and geographies such that workflow is optimized. The system of the present disclosure also requires fewer mounting points than current systems, thereby reducing installation and maintenance costs. Since the monitor mount and one or more monitors are integrated and consolidated, the space required for the system of the present disclosure is minimized. The system of the present disclosure can be used in dry and wet zones and contributes to an enhanced level of hygiene. According to caregiver preference, the system of the present disclosure can be scaled to the patient's needs— from basic monitoring to using the full range of all of the monitors. To support individual workflow, multiple monitors can be used, for example, to support anesthesiologists, perfusionists, and surgeons if a surgical display controller is used.

The system of the present disclosure provides a high acuity care system that improves aesthetics and ergonomics by allowing different caregivers to view the information they need at the same place. The system of the present disclosure can be used as part of a healthcare enterprise solution and can bring comprehensive information to the point of care, while continuously monitoring the patient. For example, the system of the present disclosure can provide access to images, lab results and other clinical data, while displaying real-time vital signs data at the point of care securely and automatically to the patient's record without having the practitioner continuously pair or match the first device such as a monitor and second device such as a sensor and/or the HIS using a biometric identifier.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The following detailed description references the drawings, wherein.

DETAILED DESCRIPTION

Figure 1:
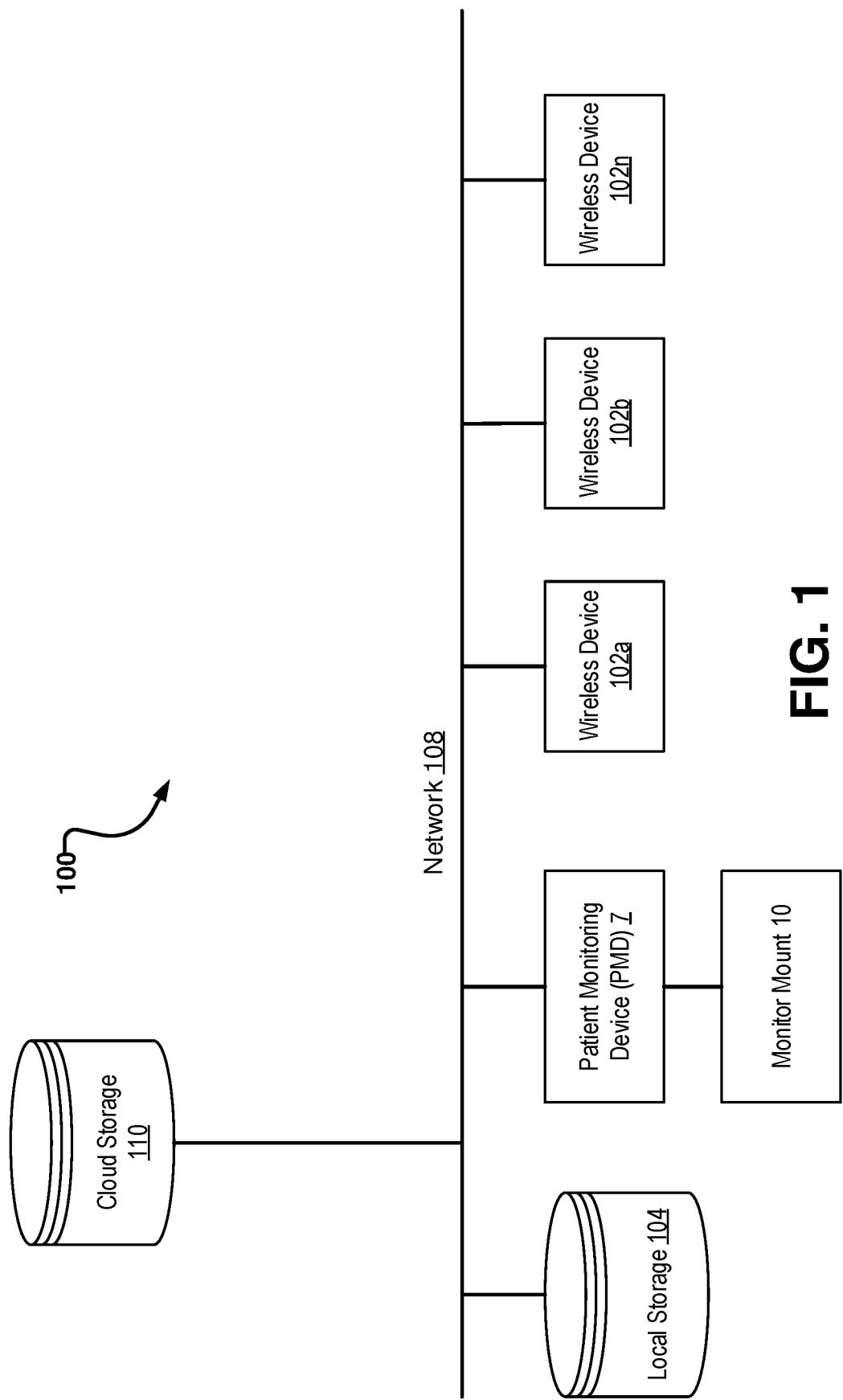
FIG. 1 is a diagram illustrating relevant portions of an exemplary hospital network.

The exemplary embodiments described herein provides a system, method, and device including same that provides an automated and secure process for associating a wireless device to a patient monitor using a unique biometric identifier. As a result, the need for manual interaction by the clinician to pair a first device (such as, without limitation, an ECG patient monitor) with one or more second devices (such as, without limitation, a SpO2, temperature, or NIBP) in a network, preferably a hospital network, in order to communicate with each other in a seamless way is eliminated. In one aspect, the system, method, and/or device described herein allows placement of multiple wireless or second device(s) (such as, without limitation, Bluetooth, WiFi, sub GHz for example), to be paired with a first device without the need for a clinician to manually initiate the pairing process.

The following description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a processor" or "a memory" includes reference to one or more of such processors or memories.

The expressions such as "include" and "may include" which may be used in the present disclosure denote the presence of the disclosed functions, operations, and constituent elements, and do not limit the presence of one or more additional functions, operations, and constituent elements. In the present disclosure, terms such as "include" and/or "have", may be construed to denote a certain characteristic, number, operation, constituent element, component or a combination thereof, but should not be construed to exclude the existence of or a possibility of the addition of one or more other characteristics, numbers, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

As used herein, the terms "associate" and "pair" may be used interchangeably. "Pairing" is a specific type of association, such as the pairing that takes place between a Bluetooth master radio and a Bluetooth slave radio that enables the device having the slave radio to maintain a wireless communication connection with the master radio and automatically reconnect.

Unless otherwise defined, all terms including technical and/or scientific terms used herein have the same meaning as commonly understood by one of ordinary skill in the art to which the present disclosure pertains. In addition, unless otherwise defined, all terms defined in generally used dictionaries may not be overly interpreted.

The subject matter described herein is directed to systems and apparatuses directed to monitors (e.g., display monitors having visual electronic displays) and monitor mounts providing physical support and, in some cases, power and access to a communications/computer network. Use of such systems and apparatuses can, for example, occur in a medical environment such as the scene of a medical event, an ambulance, a hospital or a doctor's office. When a patient undergoes initial patient monitoring in such an environment, a minimum set of sensors can be connected to a patient to collect various types of patient information as described in detail herein. In one particular embodiment, the sensor are used to obtain a unique patient identifier and store it in a database. As a patient is moved from one area of care within the medical environment to another area of care, the patient monitor can travel with the patient and additional patient physiological data is obtained from additional devices such as a wireless devices capable of gathering physiological data. The data from the wireless device is compared with the biometric identifier data acquired from the sensors connected to the patient monitor at initial monitoring and recorded in the database. If the data from the wireless device matches the biometric identifier, then the data is paired. In one embodiment, the sensors are devices that are used for measuring and/or monitoring the physiological parameters of a patient (e.g., electrocardiogram (ECG) waveform, non-invasive peripheral oxygen saturation (SpO2), non-invasive blood pressure (NIBP), temperature, and/or tidal carbon dioxide (etCO2), apnea detection, and other similar physiological data.

FIG. 1 is a simplified schematic diagram of an exemplary hospital patient monitoring and data system 100. The system 100 comprises a network 108 having a plurality of patient monitoring devices 7 that are capable of directly connecting to the network 108 or connecting through a monitor mount 10. The system 100 preferable includes local storage 104 for patient data and may optionally include cloud-based storage 110. In this exemplary embodiment, a plurality of wireless devices 102*a-n* are provided. As used in this application, the term "patient monitoring device" is a device that is capable of collecting and displaying (either on its own display or another connected device having a display) information concerning one or more physiological parameters of a patient.

Figure 2:
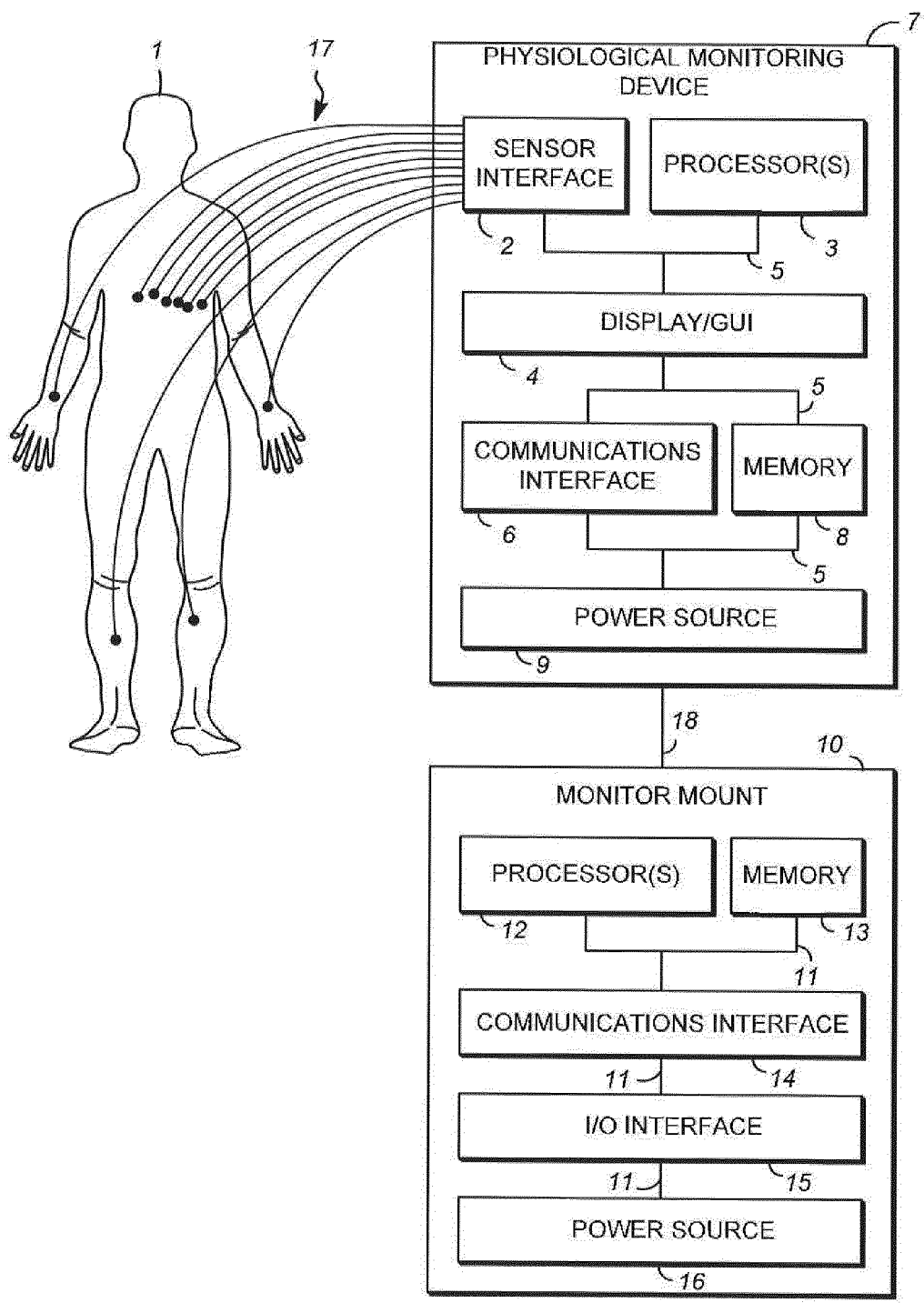
FIG. 2 is a diagram illustrating an exemplary patient monitor and monitor mount.

FIG. 2 is a schematic diagram that shows additional detail for the patient monitoring device 7 and the monitor mount 10 to which the patient monitoring device 7 is removably mounted or docked. As shown in FIG. 2, the monitoring device 7 is capable of receiving physiological data from various sensors 17 connected to a patient 1. In general, it is contemplated by the present disclosure that the patient monitoring device 7 and the monitor mount 10 include electronic components or electronic computing devices operable to receive, transmit, process, store, and/or manage patient data and information associated performing the functions of the system, which encompasses any suitable processing device adapted to perform computing tasks consistent with the execution of computer-readable instructions stored in a memory or a computer-readable recording medium.

Further, any, all, or some of the computing devices in the patient monitoring device 7 and the monitor mount 10 may be adapted to execute any operating system, including Linux, UNIX, Windows Server, etc., as well as virtual machines adapted to virtualize execution of a particular operating system, including customized and proprietary operating systems. The patient monitoring device 7 and the monitor mount 10 are further equipped with components to facilitate communication with other computing devices over one or more network connections, which may include connections to local and wide area networks, wireless and wired networks, public and private networks, and any other communication network enabling communication in the system.

As shown in FIG. 2, the patient monitoring device 7 is, for example, a patient monitor implemented to monitor various physiological parameters of the patient 1 via a plurality of sensors 17. In alternative embodiments, the patient monitoring device 7 could be a defibrillator, automated external defibrillator, a personal computer (e.g., a laptop or desktop computer), or a tablet computing device, a mobile computing device (e.g., smartphone or personal digital assistant) to list a few examples. In this exemplary embodiment, the patient monitoring device 7 includes a sensor interface 2, one or more processors 3, a display/GUI 4, a communications interface 6, memory 8, and a power source 9. The sensor interface 2 can be implemented in software or hardware and used to connect via wired and/or wireless connections to one or more physiological sensors and/or medical devices 17 for gathering physiological data from the patient 1.

The data signals from the sensors 17 include, for example, data related to an electrocardiogram (ECG), non-invasive peripheral oxygen saturation (SpO2), non-invasive blood pressure (NIBP), temperature, and/or tidal carbon dioxide (etCO2), apnea detection, and other similar physiological data. In one exemplary embodiment, the first device is a patient monitoring device 7 and the biometric identifier is established using a 12 lead (10 wires) ECG sensor such as that shown as 18 to capture the heart rate of the patient and is used as the biometric identifier. The one or more processors 3 are used for controlling the general operations of the patient monitoring device 7. Each one of the one or more processors 3 can be, but are not limited to, a central processing unit (CPU), a hardware microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and performing the functions of the patient monitoring device 7.

The display/GUI 4 is for displaying various patient data and hospital or patient care information and includes a user interface implemented for allowing communication between a user and the patient monitoring device 7. The display/GUI 4 includes, but is not limited to, a keyboard, a liquid crystal display (LCD), cathode ray tube (CRT), thin film transistor (TFT), light-emitting diode (LED), high definition (HD) or other similar display device with touch screen capabilities. The patient information displayed can, for example, relate to the measured physiological parameters of the patient 1 (e.g., blood pressure, heart related information, pulse oximetry, respiration information, etc.).

The communications interface 6 allows the patient monitoring device 7 to directly or indirectly (via, for example, the monitor mount 10) communicate with one or more computing networks and devices. The communications interface 6 can include various network cards, interfaces or circuitry to enable wired and wireless communications with such computing networks and devices. The communications interface 6 can also be used to implement, for example, a Bluetooth connection, a cellular network connection, and/or a WiFi connection. Other wireless communication connections implemented using the communications interface 6 include wireless connections that operate in accordance with, but are not limited to, IEEE802.11 protocol, a Radio Frequency For Consumer Electronics (RF4CE) protocol, ZigBee protocol, and/or IEEE802.15.4 protocol.

Additionally, the communications interface 6 can enable direct (i.e., device-to-device) communications (e.g., messaging, signal exchange, etc.) such as from the monitor mount 10 to the patient monitoring device 7 using, for example, a USB connection. The communications interface 6 can also enable direct device-to-device connection to other device such as to a tablet, PC, or similar electronic device; or to an external storage device or memory.

The memory 8 can be a single memory or one or more memories or memory locations that include, but are not limited to, a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy. The memory 8 can be used to store any type of instructions and patient data associated with algorithms, processes, or operations for controlling the general functions and operations of the patient monitoring device 7.

The power source 9 can include a self-contained power source such as a battery pack and/or include an interface to be powered through an electrical outlet (either directly or by way of the monitor mount 10). The power source 9 can also be a rechargeable battery that can be detached allowing for replacement. In the case of a rechargeable battery, a small built-in back-up battery (or super capacitor) can be provided for continuous power to be provided to the patient monitoring device 7 during battery replacement. Communication between the components of the patient monitoring device 7 (e.g., 2, 3, 4, 6, 8, and 9) are established using an internal bus 5.

As shown in FIG. 2, the patient monitoring device 7 is connected to the monitor mount 10 via a connection 18 that establishes a communication connection between, for example, the respective communications interfaces 6, 14 of the devices 7, 10. The connection 18 enables the monitor mount 10 to detachably secure the patient monitoring device 7 to the monitor mount 10. In this regard, "detachably secure" means that the monitor mount 10 can secure the patient monitoring device 7, but the patient monitoring device 7 can be removed or undocked from the monitor mount 10 by a user when desired. The connection 18 may include, but is not limited to, a universal serial bus (USB) connection, parallel connection, a serial connection, coaxial connection, a High-Definition Multimedia Interface (HDMI) connection, or other similar connection known in the art connecting to electronic devices.

The monitor mount 10 includes one or more processors 12, a memory 13, a communications interface 14, an I/O interface 15, and a power source 16. The one or more processors 12 are used for controlling the general operations of the monitor mount 10. Each one of the one or more processors 12 can be, but are not limited to, a central processing unit (CPU), a hardware microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and performing the functions of the monitor mount 10.

The memory 13 can be a single memory or one or more memories or memory locations that include, but are not limited to a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy. The memory can be used to store any type of instructions associated with algorithms, processes, or operations for controlling the general functions and operations of the monitor mount 10.

The communications interface 14 allows the monitor mount 10 to communicate with one or more computing networks (e.g., a hospital network, the Internet, third party networks/servers, cloud solutions,) and devices (e.g., the patient monitoring device 7). The communications interface 14 can include various network cards, interfaces or circuitry to enable wired and wireless communications with such computing networks and devices. The communications interface 14 can also be used to implement, for example, a Bluetooth connection, a cellular network connection, and a WiFi connection (e.g., 3G, 4G, and 5G networks). Other wireless communication connections implemented using the communications interface 14 include wireless connections that operate in accordance with, but are not limited to, IEEE802.11 protocol, a Radio Frequency For Consumer Electronics (RF4CE) protocol, ZigBee protocol, and/or IEEE802.15.4 protocol.

The communications interface 14 can also enable direct (i.e., device-to-device) communications (e.g., messaging, signal exchange, etc.) such as from the monitor mount 10 to the patient monitoring device 7 using, for example, a USB connection, coaxial connection, or other similar electrical connection. The communications interface 14 can enable direct (i.e., device-to-device) to other device such as to a tablet, PC, or similar electronic device; or to an external storage device or memory.

The I/O interface 15 can be an interface for enabling the transfer of information between monitor mount 10, one or more patient monitoring devices 7, and external devices such as peripherals connected to the monitor mount 10 that need special communication links for interfacing with the one or more processors 12. The I/O interface 15 can be implemented to accommodate various connections to the monitor mount 10 that include, but is not limited to, a universal serial bus (USB) connection, parallel connection, a serial connection, coaxial connection, a High-Definition Multimedia Interface (HDMI) connection, or other known connection in the art connecting to external devices.

The power source 16 can include a self-contained power source such as a battery pack and/or include an interface to be powered through an electrical outlet (either directly or by way of the patient monitoring device 7). The power source 16 can also be a rechargeable battery that can be detached allowing for replacement. Communication between the components of the monitor mount 10 (e.g., 12, 13, 14, 15 and 16) are established using an internal bus 11.

In one embodiment, the first device, the second device, or both can include a sensor interface configured to receive data generated by at least one physiological sensor monitoring a physiological parameter of a patient. The at least one physiological sensor can include a wired connection to the sensor interface. The at least one physiological sensor can additionally or alternatively include a wireless connection to the sensor interface.

In one embodiment, the first device, the second device, or both can be a multiparameter monitor for continuously monitoring adult, pediatric and neonatal patients both at a bedside and on transport and can support all patient acuity levels hospital-wide.

In one embodiment, either of the first device or the second device can comprise a monitor that capture and display real-time vital signs at the bedside. Either of the first monitor or the second monitor can be used as a standalone monitor or in combination. The system of the present disclosure integrates patient data and provides continuous monitoring at the bedside and on transport.

In one embodiment, the system of the present disclosure enables pick and go transport of a patient from one care area of a hospital to another care area of the hospital without having to disconnect the patient from a patient monitor. For example, the system of the present disclosure streamlines workflows by being able to go from bedside to transport in the push of a button. Cables and modules can remain attached to the patient and parameters and alarms can continue to be monitored in real time, while recording data during travel. The system of the present disclosure can also provide seamless wired-to-wireless networking, so surveillance can be continuous. No disconnection or reconnection of leads is required and there are no gaps in monitoring or data acquisition. As a result, all parameters that are monitored at the bedside can continue to be monitored on transport.

The system of the present disclosure therefore allows monitors to be mixed and matched across different care areas and geographies such that workflow is optimized. The system of the present disclosure also requires fewer mounting points than current systems, thereby reducing installation and maintenance costs. Since the monitor mount and one or more monitors are integrated and consolidated, the space required for the system of the present disclosure is minimized. The system of the present disclosure can be used in dry and wet zones and contributes to an enhanced level of hygiene. According to caregiver preference, the system of the present disclosure can be scaled to the patient's needs—from basic monitoring to using the full range of all the monitors. To support individual workflow, multiple monitors can be used, for example, to support anesthesiologists, perfusionists, and surgeons if a surgical display controller is used.

The system of the present disclosure provides a high acuity care system that improves aesthetics and ergonomics by allowing different caregivers to view the information they need at the same place. The system of the present disclosure can be used as part of a healthcare enterprise solution and can bring comprehensive information to the point of care, while continuously monitoring the patient. For example, the system of the present disclosure can provide access to images, lab results and other clinical data, while displaying real-time vital signs data at the point of care securely and automatically to the patient's record without having the practitioner continuously pair or match the first device such as a monitor and second device such as a sensor and/or the HIS using a patient identifier.

As used herein, the term "biometric identifier" means an identifier created from physiological or biometric data that is capable of uniquely identifying a human being. Examples of biometric identifiers include, without limitation, facial characteristic(s), vein characteristic(s), patient heart rate variability (HRV), fingerprint(s), retinal pattern(s), and voice pattern(s). Each wireless device that is capable of being paired to a patient monitor much have the capability of generating data necessary to establish the biometric identifier. For example, if a facial characteristic or a vein characteristic is the biometric identifier, it will be necessary for the patient monitoring device and each wireless device to include a camera that can be used to securely authenticate a user by scanning their facial characteristics and/or scanning their unique pattern of palm veins.

Figure 3:
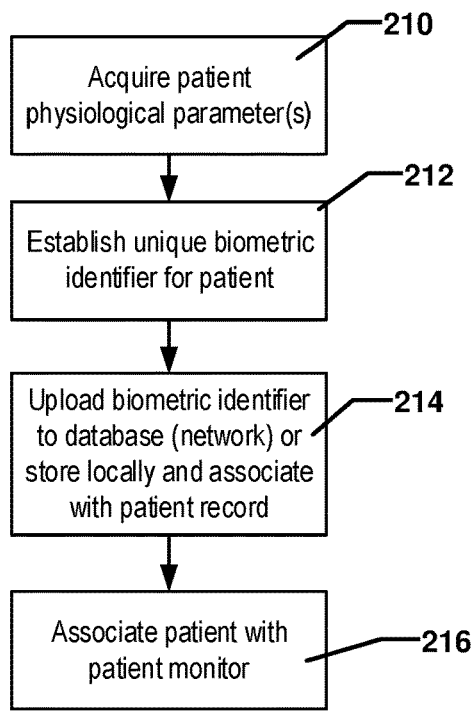
FIG. 3 a flow diagram of an exemplary method for creating a biometric identifier for a patient and associating that patient with a patient monitor.

FIG. 3 provides a flow chart of an exemplary method of creating an association between a patient and a patient monitor using a biometric identifier. As part of the admission process, physiological sensors 17 associated with the patient monitor 7 are attached to a patient and physiological data (for example, ECG data, a facial image, or a vein characteristic image) is gathered (step 210). The physiological data is then processed to establish a biometric identifier for that patient (step 212). Such processing could be conducted using the patient monitor 7 or could be conducted in another computing device on the network 108. The biometric identifier is then uploaded to a database that is accessible by any patient monitor on the network 108 (step 214) and the patient monitor 7 is associated with the patient in the database (step 216). Alternatively, the patient monitor 7 could store a local copy of either the entire biometric identifier database or the biometric identifier for the patient associated with that patient monitor 7. Storing a copy locally would enable a wireless device pairing to proceed when the patient monitor 7 isn't connected to the network. In addition, after initial biometric identifier information is uploaded to the database, the database could optionally be updated dynamically during the patient's stay at the medical facility with additional data relating to the physiological parameter (s) used to establish the biometric identifier. In addition, in the event that the patient monitor 7 isn't connected to the network 108 at the time the patient association process of FIG. 3 is performed, the biometric identifier could be stored by the patient monitor 7 and uploaded to the database when the patient monitor 7 reconnects to the network 108.

Figure 4:
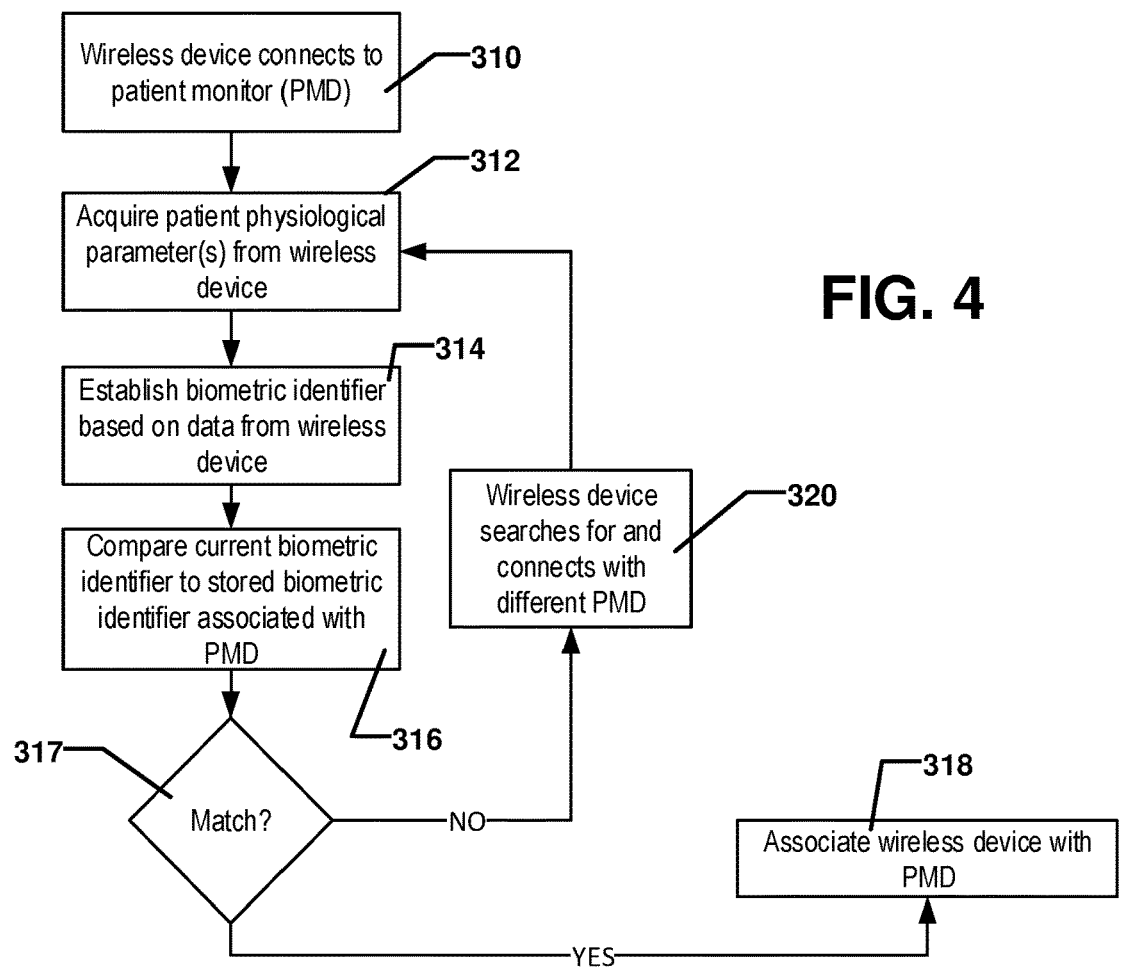
FIG. 4 is a flow diagram of an exemplary method for using biometric identifiers to pair a wireless device with a patient monitor.

Once the biometric identifier has been established for a patient and that patient has been associated with a particular patient monitor, the system 100 is capable of automatically associating wireless devices with patient monitors on the system 100. An exemplary embodiment of implementing this process is shown in FIG. 4. When a wireless device is activated, it wirelessly connects to a patient monitor that is within range of the wireless device (step 310). The wireless device then transmits physiological data to the patient monitor to which it has connected (step 312). The physiological data is then processed to establish a biometric identifier for the wireless device (step 314). The biometric identifier for the wireless device is then compared to the biometric identifier for the patient associated with the patient monitor (step 316). If the biometric identifiers match (step 317), the wireless device is associated with the patient monitor (step 318). In the event that the wireless connection between the wireless device and the patient monitor uses the Bluetooth protocol, the association could consist of pairing the wireless device to the patient monitor. If the biometric identifiers do not match, the wireless device is disconnected from the patient monitor and the wireless device connects with a different patient monitor (step 320). If the wireless device is able the connect with another patient monitor, then steps 312 through 317 are repeated with the new patient monitor. A warning or alert could optionally be displayed on the patient monitor if it is determined via the comparison of step 316 that the biometric identifiers are not a match.

The nature of the wireless data "connection" of step 310 will depend upon the wireless protocol by which the connection is established. For example, in the case of Bluetooth protocol, steps 310 through 317 could be conducted as part of the discovery process that precedes pairing of the wireless device to the patient monitor. In other words, step 316 would correspond to the authentication step in Bluetooth protocol that is a prerequisite to pairing. Instead of using a password or PIN for authentication, physiological parameter data of a patient (collected by the device seeking to pair) is the means of authentication. Similarly, the nature of the "association" of step 318 will depend, in part, upon the wireless communication protocol. In the context of a wireless connection via Bluetooth protocol, the association could consist of successful completion of the Bluetooth pairing process. A key characteristic of the "association" between a wireless device and a patient monitor is that data from the wireless device is directed to that patient monitor (and, optionally, shown on the display of that patient monitor) and not to other patient monitors. If wireless communication between the wireless device and the patient monitor is interrupted, the existence of the association may enable the wireless device to reconnect without repeating the biometric identifier comparison step (step 316). Alternatively, reconnection could require the wireless device to repeat steps 312 through 318.

Figure 5:
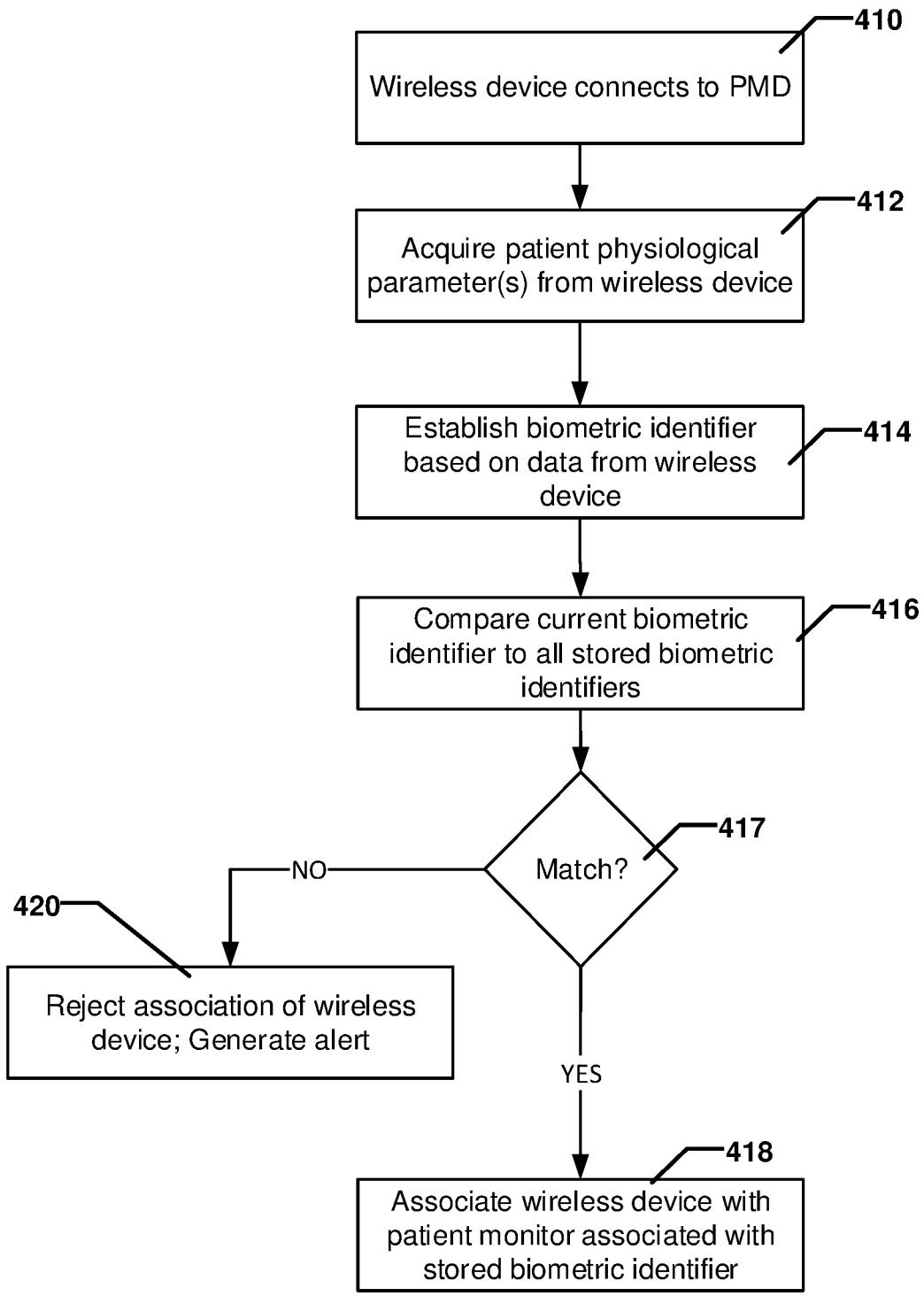
FIG. 5 is a flow diagram of another exemplary method for using biometric identifiers to pair a wireless device with a patient monitor.

Another exemplary method of associating a wireless device with a patient monitor is shown in FIG. 5. In this embodiment, steps 410 through 414 are the same as steps 310 through 314 of FIG. 4. In this embodiment, the biometric identifier created from data collected from the wireless device is compared to all of the biometric identifiers stored in the database (step 416). If the current biometric identifier matches any of the stored biometric identifiers in the database (step 417), then the wireless device is associated with the patient monitor associated with the stored biometric identifier (step 418), for example, using a key exchange. If no matches are found, then pairing of the wireless device is rejected and an alert is generated to notify clinicians that that attempted pairing/association failed (step 420). This embodiment is more amenable to less centralized network environments in which the wireless device can be associated with a patient monitor without a direct Bluetooth pairing.

Figure 6:
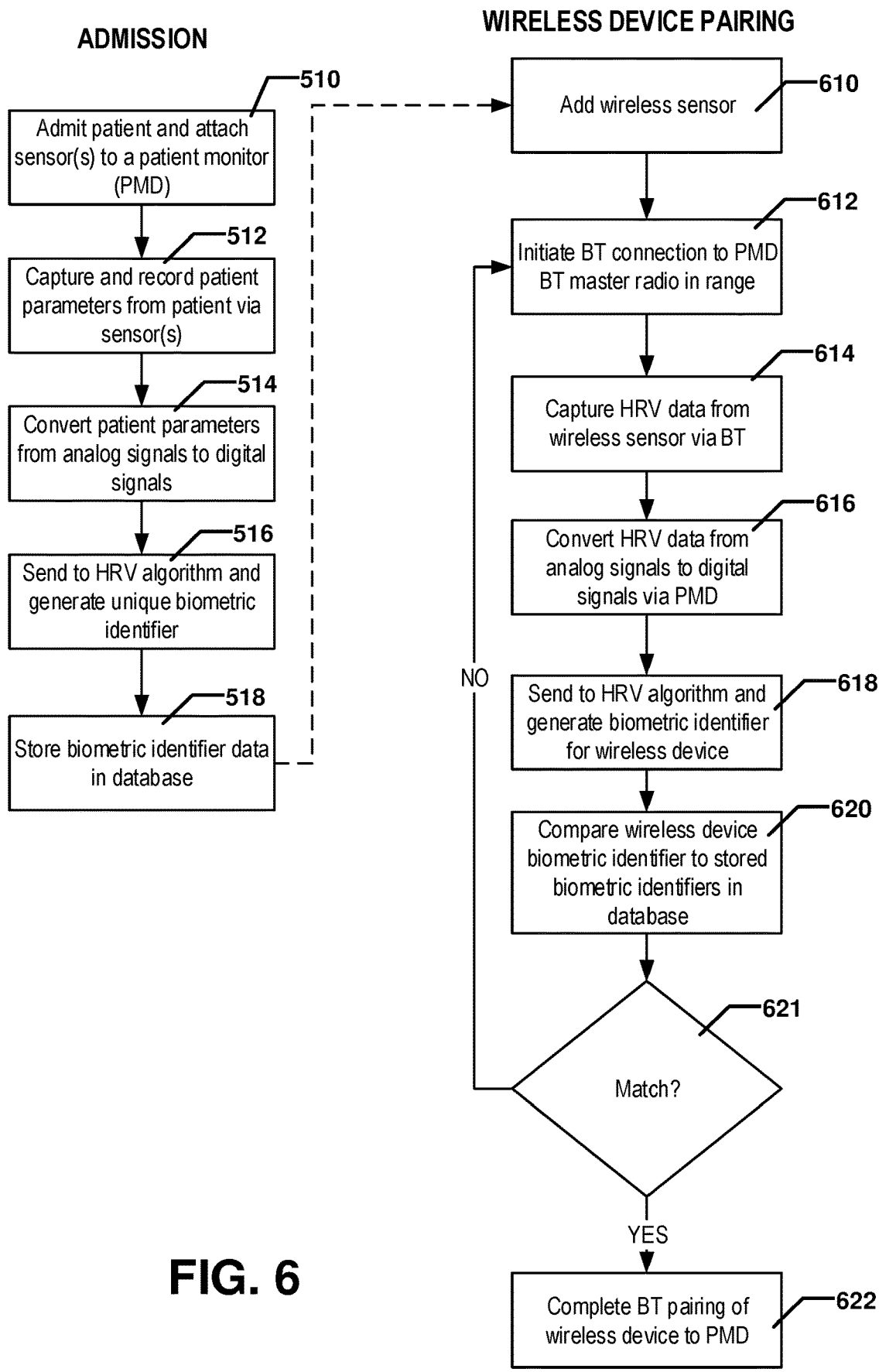
FIG. 6 is a diagram illustrating an exemplary method creating a biometric identifier for a patient based on heart rate variability, associating that patient with a patient monitor, and pairing a wireless device with a patient monitor.

FIG. 6 shows another exemplary embodiment of a process for associating patient with a patient monitoring device and enabling wireless devices to pair with patient monitoring devices using Bluetooth protocol. In this embodiment, heart rate variability data (HRV) is used as the biometric identifier. As part of the admission process, sensors (including an ECG sensor) associated with a patient monitor are connected to a patient (step 510). The ECG sensor is used to gather heart rate data, which is captured by the patient monitor (step 512), converted from analog to digital signals (step 514), and processed using an HRV algorithm to generate a biometric identifier for the patient (step 516). Heart rate variability (HRV) represents the fluctuation in the time intervals between adjacent heartbeats. HRV is generated by heart-brain interactions and dynamic non-linear autonomic nervous system (ANS) processes. In one embodiment, HRV can be calculated via at least one of time-domain measurement, frequency-domain measurement and non-linear measurements. For example, time-domain measurement may include calculation of HRV based on one or more of standard deviation, mean, average of R-R intervals or N-N intervals ("normal" R-R intervals excluding artifacts) in a pre-determined time period. Frequency-domain measurements may include estimate of distribution of absolute or relative power into different frequency bands. In another embodiment, the context information of the patient including age, gender, temperature, cardiac rhythm, respiration may also be taken into consideration when measuring HRV. Any suitable algorithm could be used to generate a biometric identifier based on HRV data. The biometric identifier is then stored in a database accessible on the hospital network (step 518) and the patient monitor is associated with that patient. The dashed line connecting steps 518 and 610 signifies that a significant amount of time may pass and other operations may be performed using the patient monitor between the performance of steps 518 and 610.

When a clinician wishes to use a new wireless device with the patient (step 610), such as a diagnostic sensor or therapeutic device, the wireless sensor paring portion of the process is used. The wireless device activates its Bluetooth radio and a connection is initiated with a Bluetooth master radio on a patient monitor that is within range (step 612). Regardless of the primary purpose of each wireless device, the device must include the capability to gather physiological data sufficient to generate HRV. For example, the wireless device could be, without limitation, a NIBP, temperature, or SpO2 sensor. The wireless device must also include an ECG sensor or other sensor capable of sensing the patient's heart rate. Data sufficient to establish an HRV is transmitted from the wireless sensor to the patient monitor (step 614), then the data is converted from analog to digital signals by the patient monitor (step 616). The digital signals are sent to an HRV algorithm and used to generate a biometric identifier for the patient associated with the wireless device (step 618). The biometric identifier for the patient associated with the wireless device is compared with the biometric identifier of the patient associated with the patient monitor (step 610). If the biometric identifiers match (step 621), then the wireless device is paired to the patient monitor (step 622). If the biometric identifiers do not match, then the wireless device disconnects from the patient monitor, searches for another patient monitor in range, and steps 612 through 621 are repeated.

Optionally, multiple biometric identifiers could be used. For example, both HRV and facial recognition could be used as biometric identifiers. If multiple biometric identifiers are used, the biometric identifier comparison (step 610) could either (a) require a match for both biometric identifiers or (b) compare primary biometric identifiers (HRV in this example), then compare secondary biometric identifiers (facial recognition in this example) only if the primary biometric identifiers do not match. In addition, if the event of a failure of the biometric comparison step (step 610), the wireless device could optionally have a back-up method of pairing with a patient monitor, such as RFID, a QR code, or NFC chip.

Figure 7A:
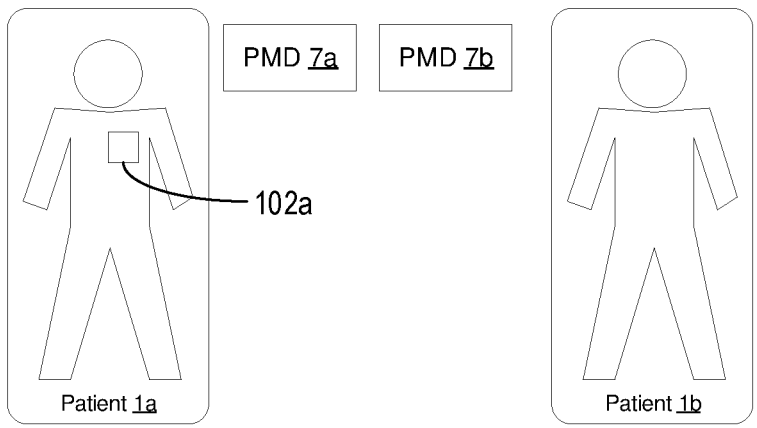
FIGS. 7A through 7C are diagrams providing a specific example of execution of the processes of FIGS. 3 and 4.
Figure 7B:
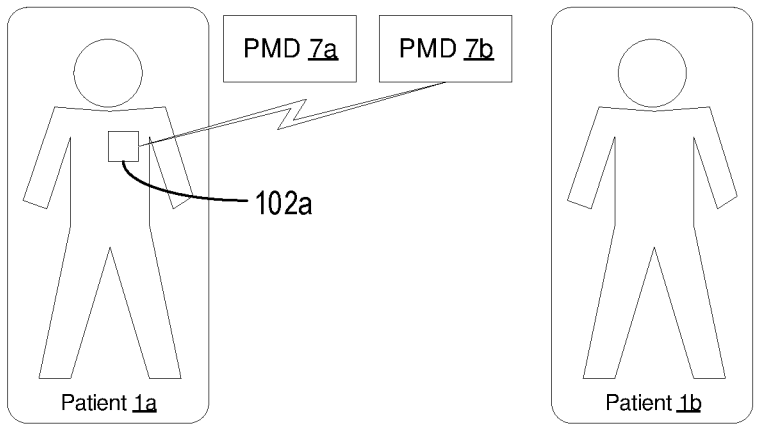
Figure 7C:
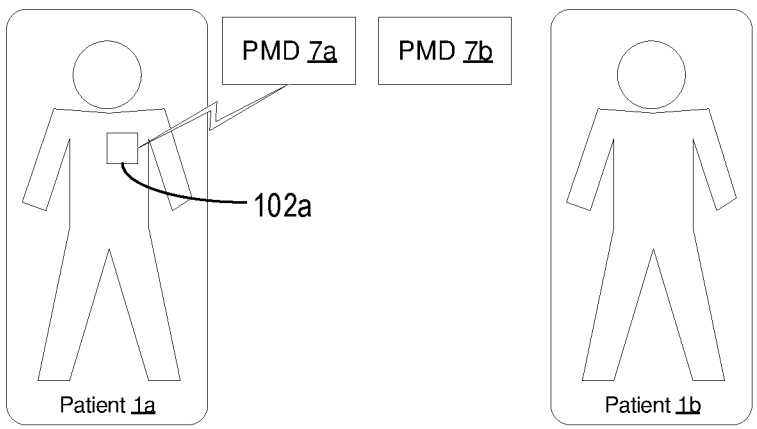

FIGS. 7A through 7C provide another visual representation and example of the processes described in FIGS. 3 and 4. Starting with FIG. 7A, two patients 1*a*, 1*b* are located in a hospital room. Patient 1*a* is associated with patient monitor 7*a* and Patient 1*b* is associated with patient monitor 7*b*—meaning that steps 210 to 216 (FIG. 3) have already been performed. Wired sensors 17 (see FIG. 2) that may be connected to patients 1*a*, 1*b* are omitted to simplify these figures. A wireless device 102*a* is positioned on patient 1*a* and activated. The patient monitors 7*a,b* could be any suitable patient monitor, such as a Draeger Medical System Inc. M300 or M540 patient monitors having Bluetooth capabilities.

The Bluetooth interface of the wireless device 102*a* searches for and makes a connection with the Bluetooth master radio of patient monitor 7*b* (see FIG. 7B). The wireless device 102*a* then begins transmitting physiological parameter data sufficient to establish a biometric identifier for the wireless device (which is connected to patient 1*a*). The physiological parameter data from the wireless device 102*a* is then processed, either by the patient monitor 7*b*, or using another computing device on the hospital network, to establish a biometric identifier for the wireless device 102*a*. The biometric identifier for the wireless device 102*a* is then compared to the biometric identifier stored in the hospital database for the patient associated with patient monitor 7*b* (patient 1*b*). The comparison of biometric identifiers will not result in a match because the wireless device 102*a* is measuring physiological parameters of patient 1a and patient monitor 7*b* is associated with patient 1*b*. Accordingly, the patient monitor 7*b* will terminate the Bluetooth connection with the wireless device 102*a* and the wireless device 102*a* will initiate a connection with another patient monitor within range-in this case, patient monitor 7*a* (see FIG. 7C). The wireless device 102*a* then begins transmitting physiological parameter data to patient monitor 7*a*. The physiological parameter data from the wireless device 102*a* is then processed, either by the patient monitor 7*a*, or using another computing device on the hospital network, to establish a biometric identifier for the wireless device 102*a*. The biometric identifier for the wireless device 102*a* is then compared to the biometric identifier stored in the hospital database for the patient associated with patient monitor 7*a* (patient 1*a*). The comparison of biometric identifiers will result in a match because the wireless device 102*a* is measuring physiological parameters of patient 1*a* and patient monitor 7*a* is associated with patient 1*a*. Because a match was found, the patient monitor 7*a* will pair with the wireless device 102*a*.

Figure 8:
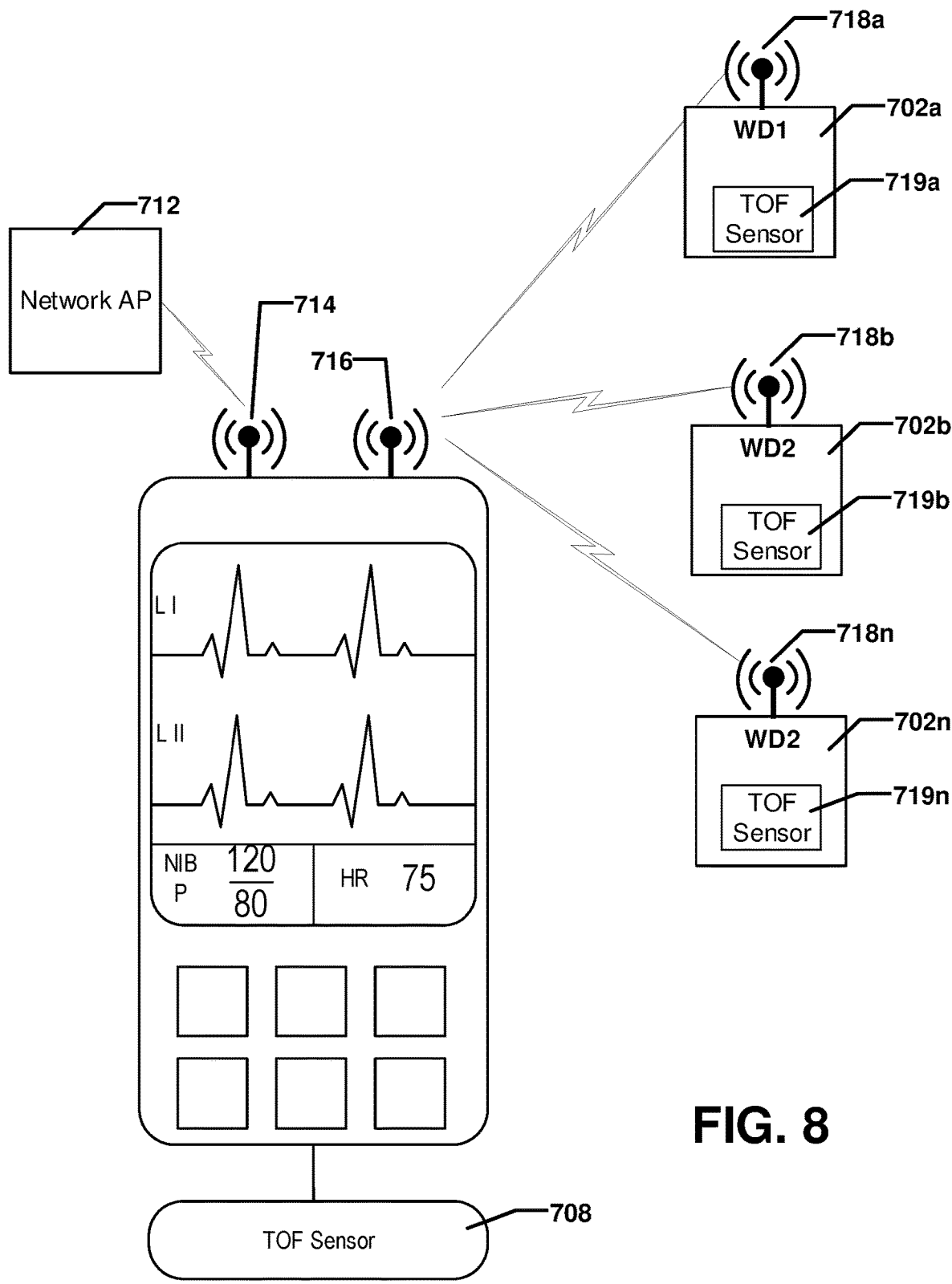
FIG. 8 is a diagram illustrating another exemplary embodiment of a patient monitor that is connected wirelessly to the network and uses a time of flight (TOF) sensor to create biometric identifiers.

FIG. 8 shows another exemplary embodiment of a patient monitor 707 that is connected wirelessly to the hospital network and uses a time of flight (TOF) sensor 708 to generate biometric identifiers. An example of such an imaging device is a time-of-flight camera such as the REAL3™ TOF camera manufactured by Infineon, Inc. In this embodiment, the patient monitor 707 includes a WiFi radio 714 that enables wireless communication with the hospital network via an access point 712. The wireless devices 702a-n each include a TOF sensor 719a-n and a Bluetooth radio 718a-n. In this embodiment the TOF sensors 708 and 719a-n are used scan a face or the veins of a wrist to establish a baseline signature which becomes the biometric identifier and is transmitted to the network.

It is also possible to advantageously use the processes disclosed herein to pair wireless devices that are used for therapeutic purposes instead of diagnostic purposes, such as devices used for the intravenous delivery of pharmaceuticals or fluids. The disclosed pairing methods could be used to confirm that the correct patient is receiving the therapeutic fluid, as well as providing a means to track delivery of the fluid.

It should be noted that, in the exemplary embodiments described herein, the wireless connection between the wireless device and the patient monitor uses the Bluetooth wireless protocol. Such wireless connections could be made with any suitable wireless protocol such as, without limitation, cellular protocol, WiFi/IEEE802.11 protocol, Radio Frequency For Consumer Electronics (RF4CE) protocol, ZigBee protocol, IEEE802.15.4 protocol, and other wireless protocols that may be developed in the future.

While the embodiments have been described with exemplary biometric identifiers, it is anticipated that future devices, sensors, or imaging technology can be used to record one more unique, patient specific identifiers, such as without limitation, glucose, EEG, respiration volume, or other commonly monitored physiological parameters or patient characteristics for automatic and secure pairing. These new or future patient-specific biometric identifiers can be used alone or in combination with any one or more of the previously mentioned biometric identifier.

Although various embodiments have been described above, these are to be regarded as merely examples. Accordingly, those of ordinary skill in the art will recognize that various changes and modifications of the examples described herein can be made without departing from the spirit and scope of the present disclosure.

Further, it is noted that the present disclosure may be implemented as any combination of a system, an integrated circuit, and a computer program on a non-transitory computer readable recording medium. The processor and any other parts of the computing system may be implemented as Integrated Circuits (IC), Application-Specific Integrated Circuits (ASIC), or Large Scale Integrated circuits (LSI), system LSI, super LSI, or ultra LSI components which perform a part or all of the functions of the computing system.

Each of the parts of the present disclosure can be implemented using many single-function components, or can be one component integrated using the technologies described above. The circuits may also be implemented as a specifically programmed general purpose processor, CPU, a specialized microprocessor such as Digital Signal Processor that can be directed by program instructions on a memory, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present disclosure may be implemented as a non-transitory computer-readable recording medium having recorded thereon a program embodying methods/algorithms for instructing the processor to perform the methods/algorithms. The non-transitory computer-readable recording medium can be, for example, a CD-ROM, DVD, Blu-ray disc, or an electronic memory device.

Each of the elements of the present disclosure may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory.

It is also contemplated that the implementation of the components of the present disclosure can be done with any newly arising technology that may replace any of the above implementation technologies.

The invention claimed is:

1. A method comprising:
   (a) gathering a first set of data associated with at least one physiological parameter of a first patient;
   (b) establishing a first biometric identifier for the first patient based on the first set of data gathered in step (a);
   (c) associating the first biometric identifier with the first patient in a biometric identifier database;
   (d) associating the first patient with a first patient monitor that is capable of being connected to a network;
   (e) placing a first wireless physiological sensing device in contact with the first patient, the first wireless physiological sensing device being capable of establishing a wireless communication link with the first patient monitor;
   (f) gathering a second set of data associated with the at least one physiological parameter from the first wireless physiological sensing device, the second set of data differing from the first set of data at least in the time of acquisition;
   (g) establishing a second biometric identifier for the first patient based on the second set of data gathered in step (f);
   (h) comparing the first biometric identifier with the second biometric identifier using the biometric identifier database; and
   (i) associating the first wireless physiological sensing device with the first patient monitor if the comparison of step (h) establishes a match between the first biometric identifier matches the second biometric identifier.

2. A method as claimed in claim 1, wherein the at least one physiological parameter is selected from the group of: a facial characteristic, a heart rate variability, a vein characteristic, a fingerprint, a retinal pattern, and a voice pattern.

3. A method as claimed in claim 1, wherein the at least one physiological parameter comprises a heart rate variability.

4. A method as claimed in claim 1, further comprising:
   (j) gathering physiological data from the patient through the first wireless physiological sensing device; and
   (k) sending the gathered physiological data to the paired patient monitoring device after the first wireless physiological sensing device has been paired with the patient monitor.

5. A method as claimed in 1, wherein the data gathered in step (f) by the first wireless physiological sensing device is gathered using a time of flight sensor.

6. A method as claimed in claim 1, wherein the first wireless physiological sensing device is capable of sensing a physiological parameter of the first patient other than the at least one physiological parameter gathered in step (a).

7. A method as claimed in claim 1, further comprising:
(j) displaying on a display for the first patient monitoring device information representative of physiological parameters of the first patient gathered from the first patient using wired sensors; and
(k) displaying on the display information representative of data transmitted from the wireless physiological sensing device if the wireless physiological sensing device is associated with the first patient monitor in step (i).

8. A method as claimed in claim 1, further comprising:
(l) storing biometric identifier database on a storage device that is accessible via the network.

9. A method as claimed in claim 8, further comprising:
(m) storing a synchronized copy of at least a portion of the biometric identifier database on the patient monitor so that step (h) can be executed regardless of whether the patient monitor is connected to the network.

10. A method as claimed in claim 1, wherein steps (a) through (d) are performed prior to any of steps (e) through (i).

11. A method of associating a wireless device to one of a plurality of patient monitoring devices on a network, the method comprising:
(a) establishing a biometric identifier for each of a plurality of patients;
(b) associating each of the plurality of patients with one of the plurality of patient monitoring devices;
(c) initiating a wireless communication link between a first patient monitoring device of the plurality of patient monitoring devices and a first wireless physiological sensing device that is in contact with a first patient;
(d) gathering data from the first wireless physiological sensing device sufficient to establish the biometric identifier for the first patient;
(e) comparing the biometric identifier established in step (d) with the biometric identifier for the patient associated with the first patient monitoring device in step (b);
(f) associating the first wireless physiological sensing device with the first patient monitoring device only if the comparison of step (e) establishes that the first patient is the patient associated with the first patient monitoring device in step (b);
(h) initiating a wireless communication link between a second patient monitoring device of the plurality of patient monitoring devices and the first wireless physiological sensing device; and
(i) repeating steps (d) through (f) for the second patient monitoring device and the first wireless physiological sensing device.

12. A method as claimed in claim 11, further comprising:
(g) discontinuing the wireless communication link between a first patient monitoring device and the first wireless physiological sensing device if the comparison of step (e) establishes that the first patient is not the patient associated with the first patient monitoring device in step (b).

13. A method as claimed in claim 11, wherein the biometric identifier established in step (a) comprises at least one selected from the group consisting of: a facial characteristic, a heart rate variability, a vein characteristic, a fingerprint, a retinal pattern, and a voice pattern.

14. A method as claimed in claim 11, wherein the biometric identifier established in step (a) comprises a heart rate variability.

15. A method as claimed in claim 11, wherein the data gathered in step (d) by the first wireless physiological sensing device is gathered using a time of flight sensor.

16. A method as claimed in claim 11, further comprising:
(g) gathering physiological data from the patient through the first wireless physiological sensing device; and
(h) sending the gathered physiological data to the paired patient monitoring device after the first wireless physiological sensing device has been paired with the patient monitor.

17. A method as claimed in claim 11, wherein the first wireless physiological sensing device is capable of gathering data associated with a physiological parameter of the first patient that is different than the data used to establish the biometric identifier in step (d).

18. A method as claimed in any claim 11, wherein steps (a) through (b) are performed prior to any of steps (c) through (f).

19. A method of associating a wireless physiological sensing device to one of a plurality of patient monitoring devices on a network, the method comprising:
(a) for each of a plurality of patients, gathering a respective first set of data sufficient to establish a biometric identifier using at least one physiological sensor connected to one of the plurality of patient monitoring devices;
(b) storing the biometric identifier for each of the plurality of patients in a database that is accessible through the network;
(c) associating each of the plurality of patients with one of the plurality of patient monitoring devices;
(d) initiating a wireless communication link between a first wireless physiological sensing device and one of the plurality of patient monitoring device, the first wireless physiological sensing device being in contact with one of the plurality of patients;
(e) gathering a respective second set of data from the first wireless physiological sensing device sufficient to establish the biometric identifier for the patient in contact with the first wireless physiological sensing device, the second set of data differing from the first set of data at least in the time of acquisition;
(f) identifying the patient by comparing the biometric identifier gathered in step (e) with the biometric identifier stored in step (b); and
(g) associating the first wireless physiological sensing device with the patient monitoring device associated with the patient identified in step (c) if the patient is identified in step (f).

* * * * *